United States Patent Office 3,027,713
Patented Apr. 3, 1962

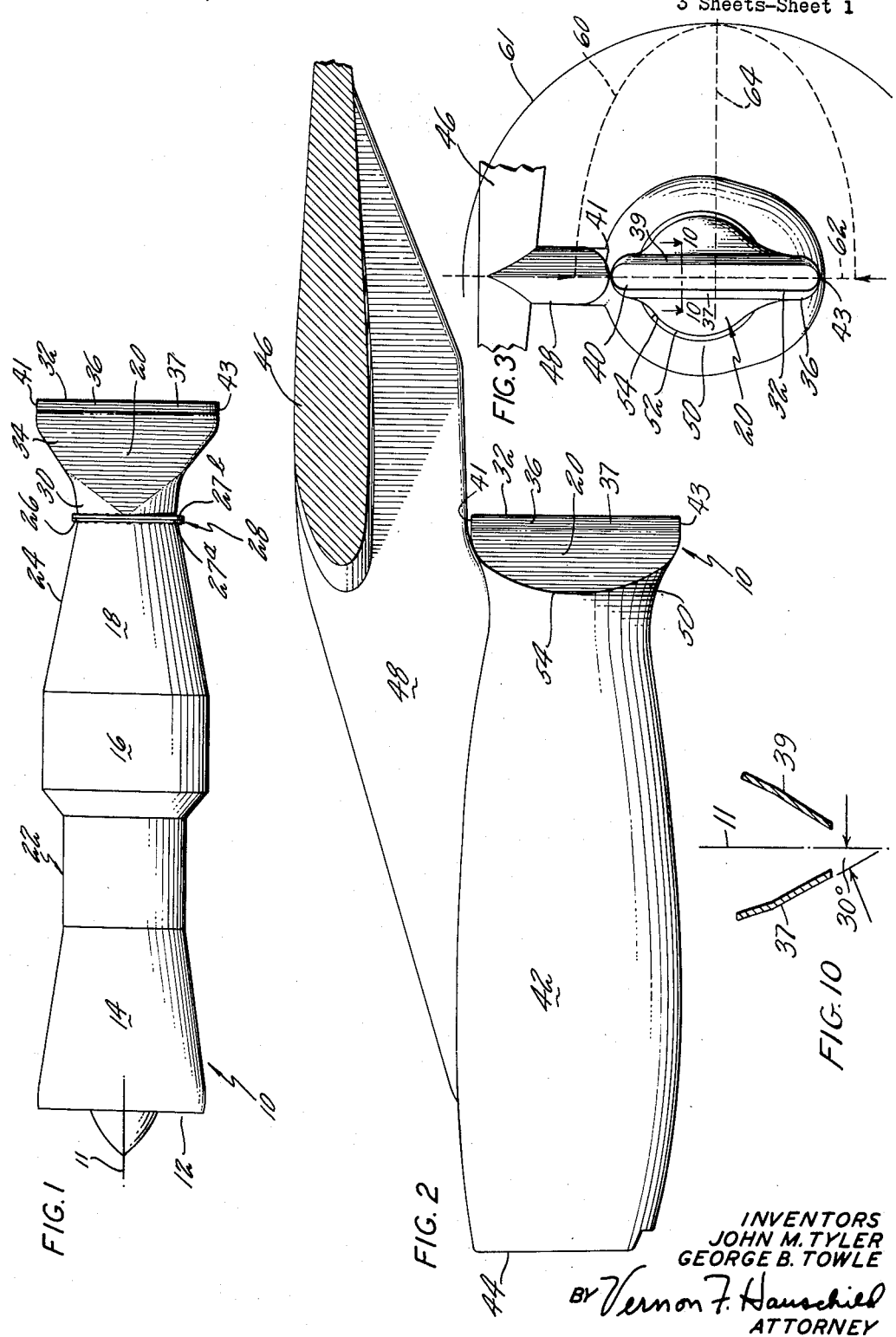

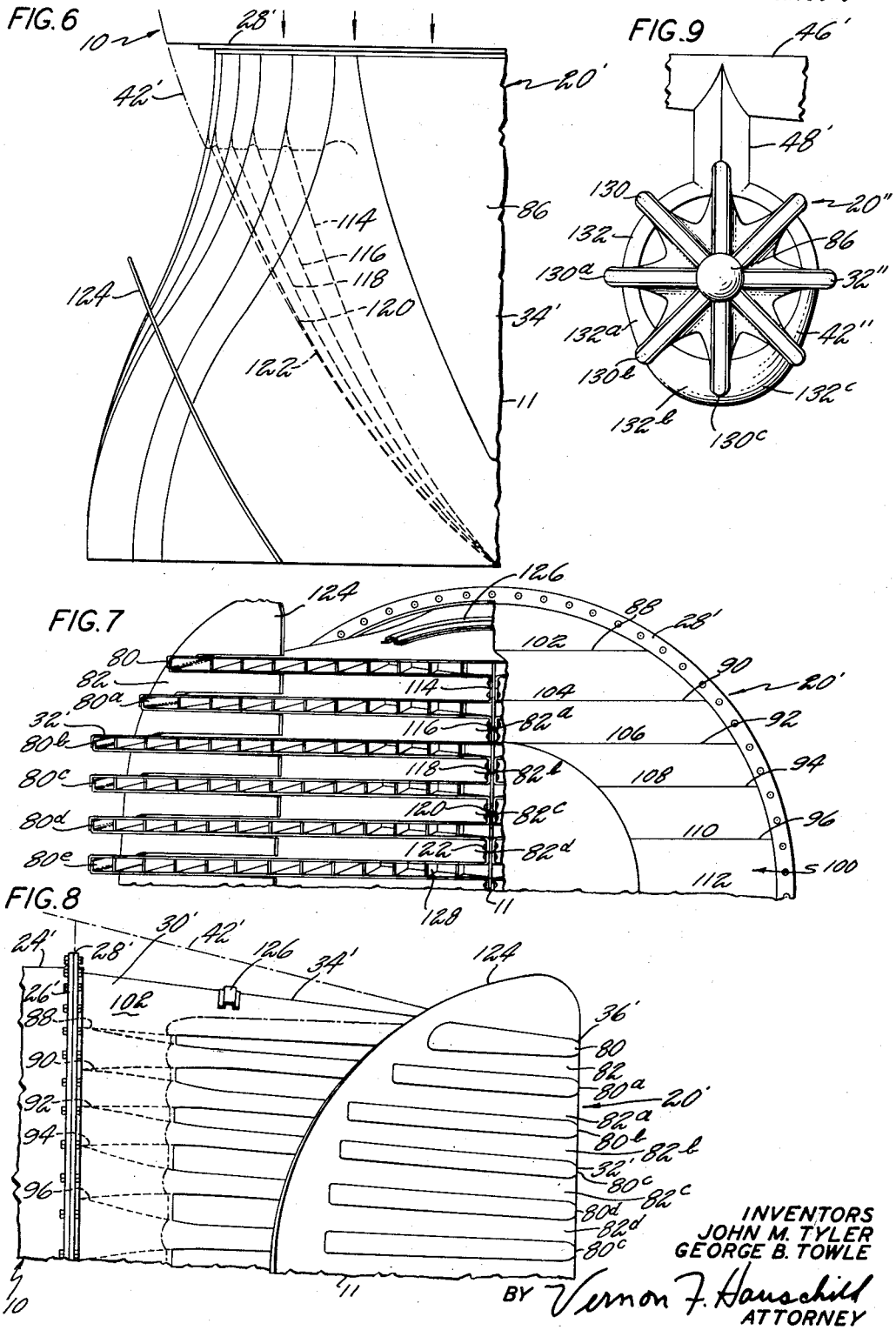

3,027,713
SLOTTED JET ENGINE NOISE SUPPRESSOR
John M. Tyler and George B. Towle, Glastonbury, Conn., assignors to United Aircraft Corporation, East Hartford, Conn., a corporation of Delaware
Filed Jan. 31, 1958, Ser. No. 712,418
1 Claim. (Cl. 60—35.6)

This invention relates to noise suppression and more particularly to the suppression of the noise created by discharging a pressurized jet into the atmosphere, for instance, to the noise created by the jet wake of a jet engine.

It is an object of this invention to teach noise suppression by causing all of the exhaust gases of a jet engine to be discharged to atmosphere to generate thrust through at least one slot. As jet engines are coming into greater use and as the thrust generated by such engines increases as does the total number of engines used on a single aircraft, it becomes imperative that the noise generated by a jet engine be either diminished or effectively shielded from thickly populated area, for instance, the cities over which jet planes will fly at low altitudes in landing and taking off from metropolitan airports. It is further important that noise suppression in the desired direction be effected without diminishing the gross thrust generated by the jet engine and without utilizing structures conducive to the creation of substantial drag, which diminishes the engine net thrust. In the past, it has been suggested that all of the engine exhaust gases be discharged to atmosphere through a plurality of small, circular rearwardly directed, holes or nozzles to create a noise spectrum peaking at a higher frequency. Experience has shown that while this is an effective way to suppress the noise created by a jet engine wake, the number of projections necessary to form these several rearwardly directed and spaced nozzles is such that a substantial drag is caused thereby, and such is detrimental to the net thrust generated by the engine. Applicants have devoted their efforts to developing noise suppression means which will not diminish the gross thrust generated by discharging the jet engine exhaust gases to atmosphere and which will cause minimal drag.

It is a further object of this invention to suppress the noise in the jet wake of a jet engine by discharging all engine exhaust gases to atmosphere through a noise suppressor unit which is attachable to the downstream end of the jet engine to receive all jet engine exhaust gases and discharge same to atmosphere through at least one slot, which noise suppressor unit is of substantially constant cross sectional area or avoids rapid cross-sectional area changes from its attachment to the downstream end of the engine to the upstream end of the nozzle adjacent its outlet.

It is a further object of this invention to teach noise suppression or abatement in jet engines which take off and land at metropolitan air fields and, therefore, will be flying at low altitude over the cities, comprising discharging all engine exhaust gases through a single vertically extending slot having its major axis directed toward the area where noise suppression or abatement is of most concern.

It is a further object of this invention to teach the suppression of the noise in the jet wake of a jet engine, comprising discharging all engine exhaust gases through a plurality of separated slots and directing a secondary fluid through the separations between slots.

Other objects and advantages will be apparent from the specification and claim, and from the accompanying drawings which illustrate an embodiment of the invention.

FIG. 1 is an external representation of a modern aircraft jet engine which generates thrust by discharging exhaust gases to atmosphere and which is shown to have a unitary noise suppressor unit attached thereto which includes a single vertically extending slot through which all exhaust gases are discharged to atmosphere.

FIG. 2 is a showing of a modern aircraft jet engine of the type shown in FIG. 1 enveloped by a nacelle or pod and supported from an aircraft wing by a vertically extending pylon or strut and showing the noise suppressor unit projecting rearwardly from the nacelle and smoothly blending with the nacelle and pylon to give a minimal drag configuration.

FIG. 3 is a rear view showing of the construction illustrated in FIG. 2 and illustrates the noise intensity pattern produced by the single vertical slot noise suppressor and the noise intensity pattern produced by a conventional circular nozzle.

Figure 4:
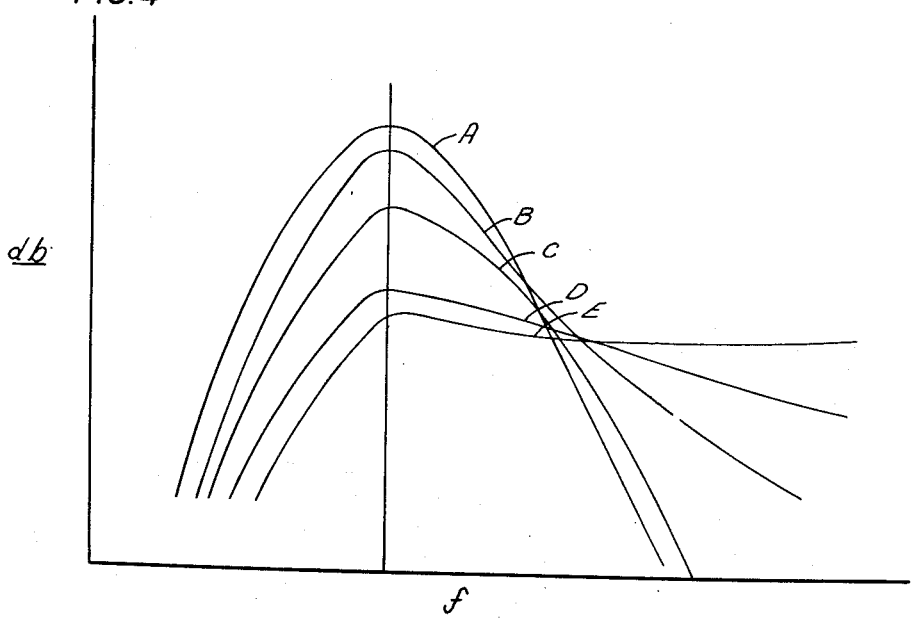

FIG. 4 is a graphic representation of reverberant chamber data showing noise power level in decibels plotted against noise frequency and depicting the noise power level spectrum obtained when engine exhaust gases are discharged through noise suppressor units of equal areas, each culminating in a slot of different aspect ratio compared with the noise power level spectrum obtained by discharging the engine exhaust gases through a single circular exhaust outlet having the same area.

Figure 5:
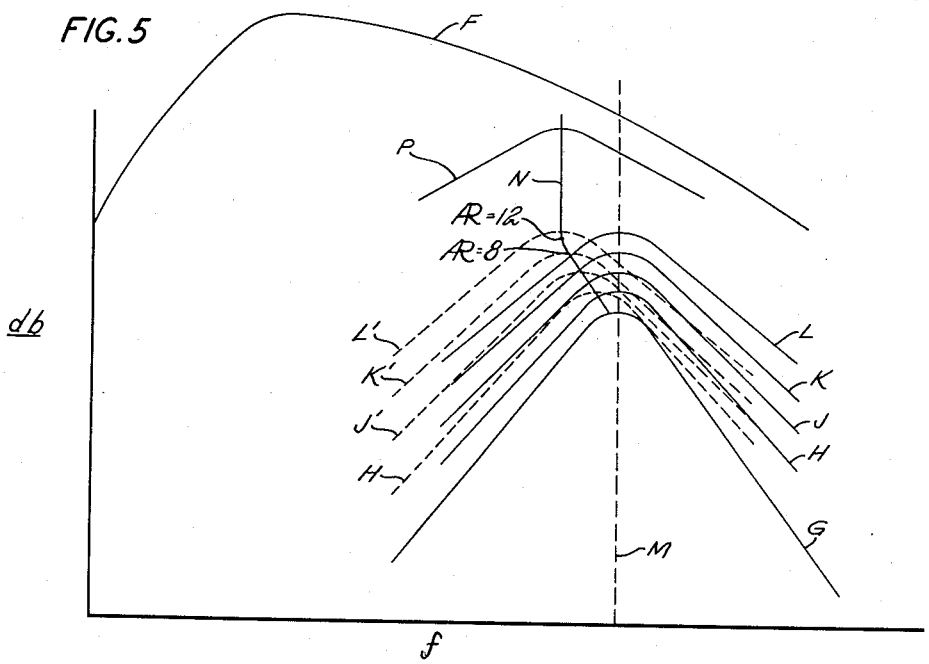

FIG. 5 is a graphic representation of reverberant chamber data depicting noise power level or the summation of all jet wake noises as the aspect ratio of a slotted noise suppressor of constant width is increased and illustrates these results in contrast to (a) the noise power level spectrum which would be obtained if all the engine exhaust gases were discharged through an accumulation of spaced circular nozzles of equal area and (b) the power level noise spectrum which would be obtained if all the engine exhaust gases were discharged through a single circular nozzle.

FIG. 6 is a fragmentary plan view of a noise suppressor unit having a plurality of parallel spaced slots with provisions for the passage of secondary fluid between the spaced slots.

FIG. 7 is a fragmentary rear view, partially in section, of the noise suppressor shown in FIG. 6.

FIG. 8 is a fragmentary side view of the noise suppressor shown in FIG. 6.

FIG. 9 is a rear view showing of a noise suppressor unit which is similar to the suppressor unit shown in FIGS. 1, 2 and 3 except that it culminates in a plurality of separated radially extending slots, which configuration is shown attached to an engine which is supported within a nacelle by a pylon extending from an aircraft wing as in FIG. 2.

FIG. 10 is an enlarged view taken along line 10—10 of FIG. 3.

As used herein, the term "aspect ratio" of a slot is meant to define the slot major axis dimension (see 62 of FIG. 3) divided by the slot minor axis dimension (see 64 of FIG. 3).

Referring to FIG. 1 we see modern aircraft engine 10 which will be described as if of the turbo jet variety, but it should be borne in mind that the teachings of this application are equally applicable to any type of flight vehicle which generates thrust by discharging fluid to atmosphere. Engine 10 is preferably concentric about axis 11 and comprises air inlet section 12, compressor section 14, burner section 16, turbine section 18 and noise suppressor unit 20. Suppressor unit 20 may be considered to replace the engine tail pipe. Engine 10 comprises an outer case 22 which is preferably of circular cross section and which culminates in discharge duct 24 which defines the exhaust gas outlet 26, which is preferably and normally of circular cross section and carries nozzle or suppressor attachment flange 27a. By any convenient attachment means 28, such as abutting flanges 27a and 27b secured by bolt and nut units, noise suppressor unit 20 is attached to the engine case 22 and more particularly to the discharge duct 24 of engine 10 to receive all engine exhaust gases therefrom and form an enclosed exhaust gas passage therewith. Noise suppressor unit 20 comprises an inlet section 30 which is fabricated to the shape and area of the engine case 22 outlet at nozzle attachment flange 27a and discharge section 32 which defines at least one slot 40, as best shown in FIG. 3. Noise suppressor unit 20 further includes intermediate section 34 which smoothly joins inlet section 30 to discharge section 32. Noise suppression unit 20 is preferably made of sheet metal so as to be light in weight and smooth on both its exterior and interior surfaces. Noise suppressor unit 20 is either of substantially constant cross sectional area or shaped to avoid rapid cross-sectional area changes throughout its length, that is from inlet section 30 to discharge section 32. A reduction in cross-sectional area is accomplished in the discharge section 32 at nozzle 36 by shaping the vertical side walls of unit 20 to be convergent to effect a velocity increase for thrust generation purposes. Nozzle 36 may be of either the convergent, convergent-divergent or other desired variety. It will be noted by referring to FIGS. 1–3 that slot 40 is defined by converging side walls 37 and 39 and parallel end walls 41 and 43 adjacent discharge section 32 of noise suppressor unit 20. By referring to FIGS. 1–3 and 10, it will be seen that each of the converging side walls 37 and 39 extend the full nozzle height and define an included angle of about 30° with axis 11. This convergent and parallel exhaust outlet defining wall contouring permits control of the shape of the exhaust gas wake downstream of the exhaust outlet in a manner to be discussed hereinafter.

Air enters engine 10 through air inlet section 12, is compressed in compressor section 14, is heated in burner section 16 and has power extracted therefrom to drive the compressor 14 as it passes through turbine section 18. From turbine section 18, all engine exhaust gases then enter noise suppression unit 20 and are directed therethrough to be discharged to atmosphere through slot 40 defined by discharge section 32. Engine 10 generates thrust by discharging the exhaust gases to atmosphere through slot 40.

Referring to FIG. 2 we see engine 10 enveloped within engine nacelle 42, which is of substantially circular cross section and which receives air, including ram air during airplane flight, through air inlet section 44. Nacelle 42 and engine 10 are supported from the aircraft wing 46 by the vertically extending strut or pylon 48. As is best shown in FIGS. 2 and 3, the portions of noise suppressor unit 20 which project rearwardly from engine nacelle 42, align with vertical strut 48 and smoothly blend with the downstream exterior 50 of engine nacelle 42 so that all exterior surfaces smoothly blend into adjacent surfaces, thereby producing no blunt exterior surfaces in which low pressure pockets may form to create base drag and further so that no blunt surfaces are presented to impede forward flight progress. This is a major feature of our invention as drag must be subtracted from engine gross thrust to determine net thrust. Fairing 50 may be integral with or attached to nacelle 42. It will be obvious by viewing FIGS. 2 and 3 that secondary fluid in the form of atmospheric air will pass over the exterior of strut 48 and nacelle 42 and thus over the exterior of noise suppression unit 20 so that the secondary fluid will be flowing immediately adjacent substantially the entire periphery of discharge slot 40 through which all engine exhaust gases are discharged as the primary fluid. Further, secondary fluid in the form of ram air will pass between the interior of nacelle 42 and the exterior of engine 10 to be discharged through the thin aperture 52 defined between nacelle outlet 54 and the exterior of noise suppression unit 20.

In other installations, nacelle 42 and strut 48 may be contoured to engulf suppressor 20 and even define slot 40.

FIGS. 4 and 5 show an additional reason, beyond drag reduction and hence net thrust increase, why our noise suppressor is of the slotted type.

FIG. 4 is a graphic representation of the noise power level spectrum which would be obtained by discharging the exhaust gases of a jet engine through constant area discharge apertures, which apertures are of varying shape to demonstrate the advantage to be gained noise suppressionwise, by the use of slot-shaped exhaust outlets in place of a circular exhaust outlet. In FIG. 4, curve A represents the spectrum of noise power level, obtained by measuring the noise in a reverberant chamber, which is created by discharging all jet engine exhaust gases of a particular engine through a circular exhaust outlet of the chosen area. Curve B represents the noise power level spectrum which is created when all of the aforementioned exhaust gases are discharged through an exhaust slot of said chosen area having an aspect ratio of 6. Curves C, D and E represent noise spectrums which are created by discharging the engine exhaust gases through slots each of said chosen area having aspect ratios of 12, 25 and 50, respectively. This graph demonstrates that no appreciable noise over all power level reduction gain is obtained by discharging the engine exhaust gases through a slot instead of a circular outlet of equal area until the aspect ratio of the slot reaches 12 and further that with increased aspect ratio above 12, increased noise suppression is accomplished.

By referring to FIG. 5 we will observe the results obtained from a noise power level spectrum standpoint, when we discharge the jet engine exhaust gases through a single circular exhaust nozzle of area A and through one or more small, separated exhaust nozzles and also through slots of comparable area to the small nozzles. Curve F represents the noise power level spectrum which would be obtained when all engine exhaust gases are discharged through a circular exhaust outlet of area A in a reverberant chamber. Curve G represents the noise power level spectrum which would be obtained when we discharge a portion of the exhaust gas through a small circular aperture of given area, in a reverberant chamber. Curves H, J, K and L represent the noise power level spectra which would be obtained by discharging a portion of the exhaust gases through 2, 4, 8 and 16 separated circular orifices in a reverberant chamber each of equal area as the single aperture used to obtain curve G. The family of curves G through L demonstrates that as fluid is discharged through an increasingly large number of small, separated, circular exhaust outlets in a reverberant chamber, the noise power level spectrum increases in intensity proportionally and peaks along the vertical frequency axis M. When instead of the 2, 4, 8 and 16 separated circular holes used to effect spectra curves H through L respectively a slot having constant width and an area equivalent to the area of the groups of holes was used, it was found that while the noise spectrum peak will occur at a comparable decibel level, the peak will occur at a reduced frequency as shown by dotted curves H′, J′, K′ and L′ such that these curves peak along line N. It should be noted that curve N is straight below an aspect ratio of 8, that it knees between an aspect ratio of 8 and 12 and that it is straight and vertically extending above an aspect ratio of 12. FIG. 5 shows that while a noise frequency reduction is experienced when we increase the aspect ratio of a discharge slot, such frequency reduction reduces at an aspect ratio of 8 and is discontinued above an aspect ratio of 12. Accordingly, when the aspect ratio of our discharge slot is increased beyond 12, we have the advantage of increased noise suppression without further reduction of the peak frequency. Curve P illustrates the noise power level spectrum which would be obtained if all of the engine exhaust gases were discharged in a reverberant chamber through a single slot of the same width as the slots used in the family of curves H' through L' and having the same area as the circular exhaust area represented by spectrum F. Curve P also represents the noise power level spectrum which would be obtained by discharging all exhaust gases through a plurality of spaced slots having the same width as those used in the slots to attain the family of curves H' through L', having an aspect ratio of 12 or more and having a total area equal to the area of the circular exhaust outlet represented by curve F, and further having provisions for the passage of secondary fluid between all slots.

By viewing FIG. 3 we will observe an additional advantage beyond noise suppression and drag reduction which we achieve by using a single vertical slot noise suppressor. Dotted line 60 represents the noise directivity or noise intensity pattern obtained by moving a microphone to predetermined positions at constant radius about the slotted exhaust outlet while line 61 represents the noise intensity pattern obtained in the same fashion for a circular exhaust outlet of equal area. It should be noted that the curves 60 and 61 are plots of noise intensity at a given point in space and not noise power level or the summation of all jet wake noises measured in a reverberant chamber, as plotted in FIGS. 4 and 5. The results clearly show that a substantial noise reduction is obtained by using the slot suppressor 20 along the major axis 62 of slot 40 as opposed to the noise reduction along minor axis 64 thereof. Accordingly, by vertically positioning a single slot noise suppressor, the additional advantage of noise reduction due to noise directivity is attained for persons located groundwardly from the jet engine powered plane in flight, for instance, city inhabitants near airports. In short, quite unexpectedly, it was discovered that a definite benefit can be obtained in a single-slotted exhaust suppressor by directing the major axis of the slot as installed in the plane in the direction in which noise suppression is most desired. Significant benefits in noise pattern as indicated by curve 60 are obtained using slotted exhaust nozzles having aspect ratios much lower than those required to obtain noise power level benefits. For example, the curve 60 benefits could be obtained using an aspect ratio of 6.

Experimental data attained in arriving at the construction taught herein shows that the salient feature of the slot or the rectangular nozzle radiation pattern is ellipticity. As used herein, the word ellipticity denotes differences in noise properties in the two longitudinal planes of a rectangular nozzle, as compared with the uniform radiation pattern from a conical nozzle. This is best shown graphically in FIG. 3 in which significantly less noise radiation is shown to project from the short ends than from the long sides of the nozzle. These data further show that maximum noise level measured in the horizontal plane, axis 64, is actually less for the slot or rectangular nozzle than for a standard conical nozzle of equal cross-sectional area, therefore, the rectangular nozzle offers a reduction in overall sound power along axis 64. In addition to this, these data show that the higher noise frequencies exhibit the greatest ellipticity.

Noise suppression experiments with the nozzle illustrated in FIGS. 1–3, that is a slot or rectangular nozzle having convergent side walls 37 and 39 and parallel end walls 41 and 43, produced the directivity pattern illustrated by the phantom ellipse of FIG. 3. Further experimenting produced the remarkable result that appreciable noise suppression directivitywise is achieved using a very modest aspect ratio. For example, by using a noise suppressor which has a square exhaust outlet (aspect ratio of unity) but with converging side walls such as 37 and 39 and parallel end walls 41 and 43, appreciable noise suppression directivitywise is achieved. More remarkably, exhaust nozzles having an aspect ratio of less than one, that is having a greater distance between converging side walls 37 and 39 than between parallel end walls 41 and 43, were also found to produce a noise suppression result directivitywise. It was thus realized that by contouring the exhaust nozzle defining walls, it is possible to control the shape of the wake of the exhaust gases a substantial distance downstream of the engine to be elongated in a vertical direction and hence produce desirable directivity pattern of ellipticity of the type illustrated in FIG. 3. This led to the realization that probably more important than the shape of the exhaust outlet per se from a noise suppression standpoint directivitywise is the shape of the exhaust gas wake produced to be elongated vertically by contouring the exhaust nozzle to be convergent at side walls 37 and 39 and parallel at end walls 41 and 43. To test this theory a nozzle of comparable cross-sectional area was tested having converging end walls substituted for parallel end walls 41 and 43, and it was found that noise suppression is thereby reduced to zero.

The main features of rectangular nozzle noise suppressors are (1) the reduction in overall noise power, (2) the elliptical noise directivity pattern, i.e. less noise radiated off the short ends than off the long sides of the nozzle and (3) the greater ellipticity of the high frequency noise than of the low frequency noise. Each of these features can be explained empirically, based upon experiments conducted to date in this field, as follows:

(1) The principle of increasing the mixing perimeter of a jet nozzle to reduce the overall noise power of a jet has been employed in the design of many noise suppressors, notably the corrugated and multi-tube suppressors. This principle can also account for some of the noise power reduction achieved by a rectangular nozzle.

(2) In tests of multi-tube arrays with the nozzles arranged in a line, it has been observed that adjacent nozzle wakes tend to shield the noise from neighboring wakes, with the net result that less noise is radiated along the line of the nozzles than normal to the line. Thus, for a single rectangular nozzle it can be reasoned that turbulent flow regions shield the noise from adjacent regions. Because of greater shielding, noise generated within the flow cannot travel across the long dimension of the wake as readily as across the short dimension, with the result that less noise is radiated off the short ends than off the long sides of the wake.

(3) The wake shielding effect can also account for the greater ellipticity in high frequency than in low frequency noise. The shielding is probably due to sound scattering by the turbulence and inhomogeneities within the jet wake. Because high frequency sound is more easily scattered than low frequency sound, the wake shielding is more effective on the higher frequency noise.

The preceding explanations of the noise radiation characteristics of rectangular nozzle noise suppressors are based on logic and intuition. It is also interesting to note that the second and third features can be explained by Lighthill's theory of aerodynamic noise applied to a rectangular jet wake. Lighthill's theory is expressed and fully explained in "On Sound Generated Aerodynamically; part II—Turbulence as a Source of Sound." Proceedings of the Royal Society A, vol. 222, 1954. First recall that Lighthill shows that the noise from a jet wake results from any small quadrupole noise sources distributed throughout the wake. The strength of a given quadrupole is a function of the local pressure fluctuation, local mean shear, and local turbulent eddy volume or quadrupole size. In a circular jet wake the mean shear $$\frac{\partial V}{\partial r}$$

(Rate of change of axial velocity component with radial distance) is by far the largest shear, so that the quadrupoles associated with $$\frac{\partial V}{\partial r}$$

are the predominant noise sources. Further, the large mean shear aligns all of the predominant noise sources, which would otherwise be randomly oriented, with the net result that the far field noise radiation pattern in the axial-radial plane is essentially that of a single large quadrupole. Both the individual and the overall quadrupole radiation patterns are four-lobed with zero noise intensity in the jet flow direction and in directions normal to the flow direction.

Because of the axial symmetry of the circular nozzle, it completely defines the far field noise radiation pattern. However, the radiation pattern of an individual quadrupole in the wake is not axially symmetrical. The individual quadrupole and overall noise radiation patterns are in a plane normal to the circular jet wake. In this plane in the quadrupole has a radiation pattern similar to that of a dipole with maximum noise radiated normal to the circles of constant mean shear and zero intensity tangent to the constant shear lines.

In the cross section of a rectangular wake, the quadrupoles are aligned along the lines of constant shear, or, along the shear planes. However, because of their greater length, the shear planes parallel to the long sides of the wake align many more quadrupoles than do the shear planes parallel to the short ends. Because the quadrupoles radiate maximum noise normal to the shear planes and no noise along the shear planes, the intensity of the noise radiated off the long sides of the nozzle is greater than that radiated off the short ends. Therefore, in a very simple picture, the far field noise in the cross-sectional plane can be represented by the combined field of two orthogonal quadrupoles, a strong quadrupole radiating maximum noise off the sides of the wake and a weaker quadrupole radiating maximum noise off the ends of the wake. The relative strengths of the two quadrupoles will obviously be a direct function of wake aspect ratio. The conclusion is that rectangular nozzle noise ellipticity or directivity should increase with increasing wake aspect ratio.

The greater ellipticity or directivity of the high frequency than of the low frequency noise of rectangular nozzles is also accounted for by Lighthill's theory, for Lighthill points out that the highest noise frequencies are generated in a jet wake close to the nozzle exit, and correspondingly lower frequencies are generated as the jet flow proceeds downstream through lower mean shear regions. Since quadrupole alignment is a direct function of mean shear, the high frequency quadrupoles located close to the nozzle exit are more completely aligned than the lower frequency quadrupoles farther downstream. For a rectangular nozzle having convergent sides and parallel ends and with an aspect ratio significantly greater than unity, the wake aspect ratio is highest close to the nozzle exit and decreases gradually with distance downstream. Because of both the decreasing wake aspect ratio and decreasing mean shear with distance downstream the high frequency noise should exhibit greater ellipticity than the lower frequency noise.

For the special class of suppressors with aspect ratio close to unity, a wake aspect ratio greater than unity is achieved through appropriate nozzle design. With this type of nozzle the wake aspect ratio rapidly increases to a value significantly greater than the nozzle aspect ratio, and then very gradually decreases with distance downstream. With this type of nozzle it might be expected that the highest frequencies generated very close to the nozzle should exhibit no ellipticity and that the mid-frequencies should exhibit the greatest ellipticity. However, experimental results indicate that the highest audible frequencies have the greatest ellipticity. Although this anomaly has not been resolved, there is a possible explanation based on Lighthill's finding that the intensity of a quadrupole is a function of the intensity of the mean shear. A low aspect ratio nozzle is designed so that the flow from the nozzle expands rapidly in one dimension and less rapidly or even contracts in the other dimension normal to the flow. If the rapidly expanding portion of the wake acts to reduce the mean shear in the direction of expansion, the strength of the quadrupoles associated with this shear will be lessened. Thus, even though the wake aspect ratio is little greater than unity close to the nozzle exit, the noise reduction resulting from the reduction of the mean shear in the expanding direction would augment the high frequency noise ellipticity.

The principle of reducing mean shear in a jet wake to reduce the strength of the quadrupoles and thereby achieve a noise reduction can account for the action of many noise suppression devices which increase the expansion rate of a jet wake. In rectangular nozzle devices the reduction of mean shear may be a major factor in the noise suppression achieved by rectangular nozzles of aspect ratio less than unity. Also in many other types of noise suppressors, such as the corrugated nozzle, which promote the rapid expansion of a jet wake, the reduction of mean shear can account for the reduction in noise power.

It will be seen that the action of the converging side walls such as 37 and 39 is to cause the exhaust gas wake to contract and form an acute angle downstream of the exhaust outlet, possibly in part by increasing the exhaust gas velocity and hence reducing the exhaust gas static pressure in that area while the action of parallel end walls 41 and 43 is to cause the exhaust gases to expand and form an obtuse angle downstream of the exhaust outlet possibly by decreasing the exhaust gas velocity and hence increasing the exhaust gas static pressure in that region.

The theory of rectangular nozzle noise suppression inherently emphasizes the necessity of maintaining a high aspect ratio exhaust wake throughout the region of predominant noise sources in the wake. The importance of high wake aspect ratio was also realized from experimental studies. In the development of rectangular nozzle noise suppressors various devices were employed to increase the wake aspect ratio, or at least to maintain a high aspect ratio throughout the region of predominant noise sources. In order to demonstrate the effectiveness of these devices, shadowgraph, smoke photography and pressure probing techniques were incorporated to outline the suppressor exhaust wake profiles. From these profiles exhaust wake aspect ratios were determined at various downstream locations. The very rapid decrease in aspect ratio to a value of one and less for the nozzle with convergent ends correlates with the negligible noise suppression by this nozzle. The nozzle with parallel ends maintains a modest aspect ratio downstream and achieves correspondingly modest noise suppression. This experimental verification of the correlation between exhaust wake aspect ratio and noise reduction further illustrates the necessity of maintaining a high aspect ratio exhaust wake throughout the region of predominant noise sources in the wake.

It may be deemed desirable to install the FIG. 1–3 noise suppressor 20 on engine 10 to be rotatable by any controllable source. For example, under conditions where ground noise is of no concern but cabin noise or structural fatigue of airplane fuselage are, it may be desired to direct the slot major axis in the direction of the cabin and fuselage. Additionally, the mating flange unit 28 permits slot orientation.

While the benefit of noise pattern directivity obtained in the FIG. 1–3 configuration may be lost, greater noise suppression due to increased slot aspect ratio may be obtained by utilizing a noise suppressor unit which discharges all engine exhaust gases thru separated slots while passing a secondary fluid between the slots. Purely for purposes of illustration parallel and radial extending slot arrays are illustrated, but the teaching is equally applicable to other slot arrays.

Referring to FIGS. 6, 7 and 8, we see fragmentary showings of a plural slot noise suppressor unit 20' comprising inlet section 30', discharge or outlet section 32' and intermediate section 34'. In each of these figures, noise suppressor unit 20' is symmetric on opposite sides of axis 11. Inlet section 30' is preferably of circular cross-section and provided with any convenient attachment means 28' which permits the attachment of inlet section 30' of noise suppressor unit 20' to the engine case 22' as defined by the engine discharge duct 24'. Obviously, the suppressor inlet section 30' and the engine discharge duct 24' are the same shape and this shape is preferably circular.

The noise suppressor discharge section 32' comprises a plurality of slots 80—80e which extend substantially parallel to one another in any chosen direction, for example, vertically or horizontally, and which are separated from one another by separations 82—82d preferably by the same sheet metal ducting which defines slots 80—80e and which extend for the full periphery of slots 80—80e so that while all of the engine exhaust gases pass through slots 80—80e, secondary fluid such as ram air passes through the full dimension of spaces 82—82d and fully engulfs or envelops the engine exhaust gases being discharged through slots 80—80e.

Intermediate section 34' smoothly joins inlet section 30' with the exhaust gas discharge slots 80—80e of discharge section 32'.

Noise suppressor 20' of FIGS. 6–8 is preferably made of sheet metal and has smooth surfaces on both its exterior and interior and envelops engine tail cone 86.

Considering the flow of engine exhaust gases through noise suppressor 20', all engine exhaust gases enter suppressor inlet 30' from engine 10. To insure the smoothest possible flow of air through suppressor 20' so that the thrust generating potential of engine 10 is not impaired by noise suppressor 20', flow separators 88, 90, 92, 94, and 96 project across gas passage 100 which is defined between tail cone 86 and noise suppressor 20' to divide the engine gas flow such that proper proportions are smoothly directed to each of the discharge slots 80—80e. For example, the area 102 formed between baffle or flow divider 88 and noise suppressor 20' is substantially the same as the area of the uppermost slot 80 shown in FIG. 7 and the gas passage 102 formed therebetween is of substantially equal area throughout its length as it changes in shape smoothly from the frustocylindrical shape shown on the righthand side of FIG. 7 to the exhaust gas discharge slot 80 shown on the lefthand side of FIG. 7. The corresponding intermediate section 30' of gas passage 102 diminishes in height while it increases in width to permit this constant area relationship. A nozzle such as 36' for slot 80 is located immediately adjacent outlet 32' for velocity recovery purposes. A similar situation with respect to constant area flow, except for the downstream nozzle, exists between gas passages 104, 106, 108, 110 and 112 with respect to exhaust gas discharge slots 80a, 80b, 80c, 80d and 80e, respectively, so that the total engine exhaust gas passage area is substantially constant throughout the length of noise suppressor 20'. In this fashion, the engine gross thrust is not impaired by engine gas flow through noise suppressor unit 20'.

It is essential for purposes of noise suppression that secondary fluid such as ram air pass between adjacent slots 80—80e and this is accomplished by establishing separations or spaces 82, 82a, 82b, 82c, and 82d therebetween by contouring the sheet metal of noise suppressor 20' inwardly along lines 114, 116, 118, 120 and 122 as shown in FIG. 6 so that, for example, the sheet metal defining adjacent slots 80 and 80a, together with sheet metal surface 114 define slot separation 82. Slot separating areas 82—82d are essential to noise suppression since it is imperative that the exhaust gases being discharged through slots 80—80e mix immediately with and be engulfed by a flow of secondary fluid such as ram air. Secondary fluid deflectors 124 may be used to deflect the ram air inwardly within spaces 82—82d toward axis 11 of engine 10 to insure secondary fluid flow throughout the full dimension of spaces 82—82d and hence throughout the full periphery of slots 80—80e.

For fabrication and strength purposes it may be deemed necessary and advisable to utilize support ribs 126 while stiffeners and stringers such as 128 may be used to support the sheet metal defining slots 80—80e. Baffles 124 also serve to stiffen the structure.

In the configuration shown in FIGS. 6–8, the airplane engine nacelle 42' is shown in phantom so as not to conceal the noise suppressor and is fabricated to extend rearwardly beyond engine 10 to smoothly blend with noise suppressor unit 20'.

Another potential plural slot configuration is shown in FIG. 9 in which noise suppressor 20'' is fabricated in the same fashion at its inlet as is noise suppressor 20' in FIGS. 6–8 but which culminates at its discharge end 32'' in a plurality of radially extending slots 130—130c, through which all engine exhaust gases will be discharged. Slots 130—130c form separations 132 through 132c therebetween through which secondary ram air will flow to engulf the engine exhaust gases discharged through the slots. FIG. 9 shows noise suppressor 20'' as part of an engine such as 10, supported within nacelle 42'' by airplane wing 46' and strut 48' in the same fashion shown in FIG. 2.

It is to be understood that the invention is not limited to the specific embodiment herein illustrated and described but may be used in other ways without departure from its spirit as defined by the following claim.

We claim:

A jet engine generating thrust by expelling heated and pressurized exhaust gases to atmosphere and having an enveloping outer case of circular cross section concentric about an axis and with an inlet and an outlet, in combination with a noise suppressor comprising a unitary thin-walled duct unit concentric about said axis, said duct unit having an exhaust gas inlet section of circular cross section attached to said engine outlet to receive all engine exhaust gases therefrom, said duct unit also having an exhaust gas outlet section defining a plurality of elongated, parallel, spaced coplanar, horizontal slots extending perpendicular to said axis and through which all engine exhaust gases are discharged to atmosphere, said duct unit further having an intermediate section smoothly joining said inlet and outlet sections and cooperating therewith to define a unitary gas passage with said engine outer case, said intermediate section including ducting defining alternate and adjacent internal and external horizontal passages, said internal passages joining said inlet section and said slots and being of substantially constant cross-sectional area throughout while decreasing rearwardly in vertical dimension and increasing rearwardly in horizontal dimension and each culminating in a reduced area nozzle immediately upstream of said slot defining outlet section, said external passages located between said internal passages and slots and increasing rearwardly in width to be maximum adjacent said slots so as to fully envelope said slots so that ram air will be passed therethrough when said engine is in motion to mix with the engine exhaust gases being discharged through said slots to suppress exhaust gas noises, fluid deflectors located in said external passages and extending outwardly therefrom at their forward end to intercept ram air, and then converging toward said axis to divert ram air into said external passages adjacent said axis and support means located in said duct unit outlet sections to support said outlet sections in slot defining shape against exhaust gas pressure.

References Cited in the file of this patent

UNITED STATES PATENTS

| | | |
|---|---|---|
| 1,949,041 | Lagabbe | Feb. 27, 1934 |
| 2,546,293 | Berliner | Mar. 27, 1951 |
| 2,633,703 | Tenny et al. | Apr. 7, 1953 |
| 2,651,172 | Kennedy | Sept. 8, 1953 |
| 2,664,700 | Benoit | Jan. 5, 1954 |
| 2,734,698 | Straayer | Feb. 14, 1956 |

FOREIGN PATENTS

| | | |
|---|---|---|
| 165,369 | Australia | Sept. 26, 1955 |
| 744,196 | Great Britain | Feb. 1, 1956 |

OTHER REFERENCES

Publication: "A Jet Exhaust Silencer," Noise Control, pages 37–41, 54, July 1955, by John Tyler.

Publication: "Jet Noise Can Be Cut," Aviation Age, pages 48–53, vol. 25, No. 4, April 1956, by Holden Withington.

Publication: "New Type Of Tip Jet To Reduce Noise," Journal of The Helicopter Association of Great Britain, vol. 9, No. 3, January 1956, pages 404–410, by E. J. Richards.

Callaghan "Investigation of Far Noise Field of Jets I—Effect of Nozzle Shape," NACA Tech. Note. 3590, January 1956.